United States Patent [19]

Jenkin

[11] 4,187,200

[45] Feb. 5, 1980

[54] METHOD OF MAKING A SUPPORTED POROUS METAL CATALYST

[76] Inventor: William C. Jenkin, 382 Dorchester Rd., Akron, Ohio 44320

[21] Appl. No.: 917,278

[22] Filed: Jun. 20, 1978

[51] Int. Cl.² .................... B01J 23/74; B01J 35/00
[52] U.S. Cl. ........................... 252/472; 252/477 Q
[58] Field of Search ............ 252/466 J, 472, 477 Q, 252/425.3, 477 R; 204/35 R, 37 R, 146; 427/226, 244, 247

[56] References Cited

U.S. PATENT DOCUMENTS

| | | | |
|---|---|---|---|
| 3,663,162 | 5/1972 | Randhava | 252/477 Q |
| 3,846,344 | 11/1974 | Larson et al. | 252/477 Q |

*Primary Examiner*—W. J. Shine

[57] ABSTRACT

A highly active metal catalyst is prepared by producing a coating of an alloy on a supporting surface, the alloy containing a catalytic metal such as nickel or platinum and a second metal such as aluminum or iron which is capable of forming a volatile compound, reacting the coating with a material forming a volatile compound with the second metal, and volatilizing the compound, which leaves the supporting surface with a coating of the catalytic metal in a highly active condition.

10 Claims, No Drawings

METHOD OF MAKING A SUPPORTED POROUS METAL CATALYST

BACKGROUND

Metals have been known to catalyze many different kinds of chemical reactions, and have been prepared in a variety of physical forms for that purpose.

Specifically, platinum, palladium, iridium, rhenium, nickel, iron, copper, and various other metals have been used to catalyze a variety of reactions.

Nickel is particularly useful in the form of "Raney nickel" for catalyzing the hydrogenation of fats and various other purposes. It is produced by alloying nickel and aluminum, and dissolving most of the aluminum with alkali solution, to produce catalysts of porous metallic nickel.

OBJECT OF THE INVENTION

The object of this invention is the preparation of metallic catalysts in conveniently usable and highly active forms by a simple and economical process.

SUMMARY OF THE INVENTION

The invention consists in depositing an alloy of two metals, one of which possesses catalytic properties, on an inert supporting surface, and removing much or most of the non-catalytic metal by conversion to a vaporizable compound, which is then carried away in vapor form.

The removal of the non-wanted, non-catalytic metal, in accordance with this invention, is accomplished by reacting the unwanted metal with a material which converts at least a large part of it to a volatile compound, without affecting the catalytic metal, and then volatilizing the compound.

The removal of one metal from a solid alloy, as just mentioned, generally leaves the remaining metallic structure in essentially the same condition in which it existed in the alloy, with voids where the removed metal had been. The consequence is that the catalytic metal, like the familiar "Raney nickel" and many other previously known metallic catalysts, has an extremely large area of surface even though it occupies only a small space.

The unwanted metal can be converted to a volatile compound in various ways, for elimination of the unwanted metal by volatilization.

The consequence is that the remaining metal on the supporting surface has the shape of the support, which may be of any kind that is convenient for the catalytic operation which is to be carried out. The remaining metal also has a surface area of active catalytic metal a tremendous number of times greater than the apparent surface of the coated support.

The supporting surface can take almost any desired form, such as plane or irregular sheets, simple or finned cylinders, grids, or loose granules, to mention only a few. In every case, though, the catalytic material in this invention is a thin porous layer on the surface of a supporting structure of other material, which will generally be an inexpensive, structurally strong and durable material.

In particular, in those situations in which temperature control requires either supply or removal of heat during a catalyzed reaction, it is desirable for the surface through which heat is supplied or removed to be also the supporting surface for the active catalytic metal, and preferably to be metallic so that heat transfer is reasonably effective.

The production of a coating of the alloy which is later to be converted to a catalytic surface can be accomplished in various ways, depending on the shapes which are preferred and especially on the physical properties of the particular alloy which is to be converted to the catalytic surface.

If the two metals are of such a kind that they can be electroplated simultaneously, that will often be a preferred procedural step.

If the two metals are of such a kind that they can be chemically vapor deposited simultaneously, that can also be a preferred procedural step.

If the two metals are of such a kind that they can be deposited sequentially, then heated to cause them to alloy, that can be a preferred procedural step.

In other instances, a coating can be applied to a supporting base by flame spraying fine particles of the alloy in a fused condition. In still others, the supporting material can be coated by steps which include dipping in a bath of molten alloy.

In every instance, a quite thin surface layer of catalytic metal is generally sufficient, and catalyst expense can be minimized by providing a suitable alloy on a supporting surface, followed by volatilization of at least some of the non-catalytic portion of the alloy.

DETAILED DESCRIPTION

The first step of this invention is the preparation of the support for the metallic catalyst. It will, of course, need to be inert to the particular reaction which is being catalyzed, and have physical properties consistent with the procedures to be followed in the second and third steps. Accordingly, a great many kinds of material will be found suitable, both metallic and non-metallic, depending primarily on the nature of the reaction which is to be catalyzed and the identity of the catalytic metal.

The second step is the preparation and emplacement of a suitable alloy, the nature of which also will depend on the properties of the particular catalytic metal which is to be used.

The third step, and often the final step, is the conversion of the unwanted alloying metal to a volatile compound, accompanied usually by its volatilization and removal to produce the porous structure of catalytic metal. The exact nature of this step will depend primarily on the chemical properties of the metal which is to be removed.

There are many kinds of volatile compounds of metals. Those chosen for use in this invention are those resulting from use of a reagent, preferably in gaseous form, which will react directly with one metal of an alloy to produce a volatile compound, but will not react with the other metal. Examples are carbon monoxide, which will react easily with nickel, and fairly readily with iron and cobalt, but not with most other metals; and the halogens and especially chlorine, which will react easily with tin or iron, but not with nickel.

The following examples will present particular combinations of choices of these several conditions:

EXAMPLE 1

The disassembled finned tube surface and inside shell of a heat exchanger, are electroplated at 200 amperes/m$^2$ until a 0.08 mm plating is deposited of a tin-nickel alloy approximately ⅔ tin, ⅓ nickel in a plating bath at 66° C. composed of:
- Stannous chloride anhydrous—50 g/l
- Nickel chloride ($NiCl_2.6H_2O$)—300 g/l
- Ammonium bifluoride—60 g/l
- Ammonium hydroxide—to pH of 2.5.

The condenser is assembled, all parts heated to 230° C. while purging with nitrogen, then chlorine gas is flowed through the electroplated shell side of the condenser. The chlorine reacts with the tin and forms volatile tin tetrachloride. After 30 minutes the introduction of chlorine is discontinued, the temperature is raised to 260° C., the condenser purged with nitrogen, then with hydrogen gas while cooling to room temperature.

The catalytically coated surfaces so made can be used for essentially any reaction catalyzed by nickel, and particularly the conversion of the products of coal hydrogenation to methane.

EXAMPLE 2

The disassembled finned tube surface and inside shell of a heat exchanger are electroplated with a 0.08 mm coating of nickel from a sulfamate type commercial bath, then a 0.12 mm coating of tin from any commercial tin plating bath is applied.

The parts are heated to 230° C. for 8 hours, then 260° C. for 8 hours, then 315° C. for 8 hours to alloy the two coatings.

The condenser is assembled, all parts heated to 230° C. while purging with nitrogen, then chlorine gas is flowed through the shell side of the condenser. The chlorine reacts with the tin and forms volatile tin tetrachloride. After one hour, the condenser is purged with nitrogen, then hydrogen gas while cooling to room temperature.

The equipment can then be used, as in Example 1, for catalysis of any desired reaction which is promoted by active nickel.

EXAMPLE 3

Very coarse iron screens (2.5 mm wire, 120 wires/m) are electroplated with 0.1 mm of an alloy approximately ⅔ iron, ⅓ nickel from a plating bath of this composition:
- Nickel sulfamate—120 g/l
- Ferrous sulfamate—200 g/l
- Nickel chloride—15 g/l
- Sodium chloride—15 g/l
- Boric Acid—30 g/l
- Ammonium sulfamate—30 g/l
- pH—3.3
- Temperature—60° C.
- Current density—500 amps/m²
- Anodes—⅓ nickel, ⅔ iron.

The plated screens are placed in a gas tight chamber, which may be lined with nickel. The chamber is purged with nitrogen, heated to 370° C. and chlorine gas is passed through. It reacts with the iron of the alloy coating, forming volatile ferric chloride. After one hour, the chamber is purged with nitrogen and then hydrogen and cooled to room temperature. It should be purged with nitrogen before opening to the air.

The same chamber can be used as the catalytic reactor section of a chemical process plant.

EXAMPLE 4

A rotatable cylinder having a heating jacket and inlet and outlet pipes and with provision for heating or cooling entrance and exit fluids, is loaded with alumina carrier pellets of the high surface area kind.

The cylinder is purged with nitrogen at 175° C. for an hour for elimination of moisture while cooling exit gases to 80° C. The cylinder is cooled to 130° C. while a nickel carbonyl vaporizer is heated to 80° C. The nickel carbonyl vapor, mixed with 10% carbon monoxide, is passed through the rotating cylinder for two hours, which deposits a nickel coating on the pellets.

The nickel carbonyl is shut off and the carbon monoxide is continued for 15 minutes to purge the cylinder, followed by a purge with nitrogen at 235° C.

A vaporizer is heated to 220° C. for supply of tri-isobutyl aluminum vapor. The vapor conduit and a preheater for carrier gas are heated to 150° C. and gas volumes are adjusted to supply a gas to the rotating cylinder, consisting of nitrogen 54 parts, isobutylene 10 parts, and tri-isobutyl aluminum vapor 25 parts. After 10 minutes an additional 10 parts nitrogen and 1 part air are added to the gas flow, and treatment is continued for two hours to deposit a coating of aluminum over the nickel coating on the pellets.

The tri-isobutyl aluminum and air are turned off and the cylinder is purged for 15 minutes with nitrogen and isobutylene, after which the isobutylene is turned off.

The cylinder filled with nitrogen gas is heated for an hour to 550° C. to alloy the nickel and aluminum coats, after which the temperature is reduced to 300° C., and the nitrogen is turned off.

Chlorine is passed through the cylinder for a half hour to convert the aluminum in the alloy coating to volatile aluminum chloride which is swept out of the cylinder by the gas. The chlorine is turned off and the cylinder is cooled while being purged with nitrogen, to eliminate the chlorine.

When the cylinder is cool, the nitrogen is replaced with hydrogen which is in turn replaced with nitrogen again.

The pellets are found to be coated with metallic nickel in an extremely porous and highly active condition, and can be used for any of the many purposes for which active forms of nickel such as Raney nickel are useful.

EXAMPLE 5

The same reaction cylinder described in Example 4 is charged with activated charcoal granules of a size which will pass a wire screen with 160 wires per meter (American standard no. 4 screen).

The cylinder is rotated while nitrogen is passed through at 218° C. to remove air. A mixture of vapors is then introduced, containing:
- Tetrakis platinum trifluorophosphine—20%
- Trifluorophosphine—10%
- Iron pentacarbonyl—70%

After two hours the vapors are discontinued and a mixture of equal parts of carbon monoxide and trifluorophosphine are passed through for 15 minutes to sweep out the vapors, including any moisture.

The temperature is raised to 375° C. and chlorine is passed through for an hour, which forms ferric chloride and removes most of the iron, leaving a porous and highly active coating of platinum on the granules.

EXAMPLE 6

The same reaction cylinder described in Example 4 is charged again with alumina catalyst carrier pellets, and nitrogen gas is passed through to remove air while it is heated to 230° C. and is rotating.

A flow of vapors is introduced, consisting of 5% nickel carbonyl, 80% iron carbonyl, 5% carbon monoxide and 10% water vapor, which deposits a coating of about ⅔ iron and ⅓ nickel, with all of the nickel carbonyl decomposed but only part of the iron carbonyl. Unreacted vapors are condensed and are reused.

After two hours, carbon monoxide alone is passed through to displace the carbonyls and water vapor. The carbon monoxide is discontinued and chlorine gas is passed through, with the temperature at 375° C. The chlorine reacts with iron and forms volatile ferric chloride which is carried away by the incoming gas. After one hour the chlorine is shut off and the cylinder is purged with nitrogen.

The pellets are coated with an extremely porous and highly active surface of nickel.

EXAMPLE 7

The disassembled finned tube surface and inside shell of a heat exchanger are electroplated with a 0.08 mm coating of nickel from a sulfamate type commercial bath. The coated parts are then dipped in a conventional flux bath, and then immersed in a bath of molten tin at 325° C. for one hour. The tin "wets" the surface and rapidly alloys with the nickel. The coated parts are removed, cooled, and washed to remove adhering flux.

The condenser is assembled, all parts are heated to 230° C. while purging with nitrogen, then chlorine gas is flowed through the shell side of the condenser. The chlorine reacts with the tin and forms volatile tin tetrachloride. After one hour, the condenser is purged with nitrogen, then hydrogen gas while cooling to room temperature.

The equipment can be used, as in Example 1, for catalysts of any desired reaction which is promoted by active nickel.

It is evident that this invention provides a very versatile procedure for application of a minimal, and therefore inexpensive, quantity of catalytic metal on supports of almost any desired kind, and that the catalytic metal will be in a physical and chemical condition assuring an extremely high catalytic activity.

I claim:

1. The method of making a highly active metal catalyst, which method comprises producing a coating of an alloy on a supporting surface, the alloy containing a first metal having catalytic properties, and a second metal capable of forming a volatile compound, reacting the coating with a material forming a volatile compound with the second metal, and removing the compound by volatilization.

2. The method of claim 1, in which the alloy coating is produced by simultaneously decomposing vapors of volatile compounds of the two metals.

3. The method of claim 1, in which the alloy coating is produced on discrete granules of supporting material.

4. The method of claim 1, in which at least a part of the coating results from dipping in a molten metal or alloy.

5. The method of claim 1, in which the alloy coating is produced by applying successive layers of two different metals, and heating to alloy the metals in the two layers.

6. The method of claim 1, in which the alloy coating is produced by electroplating.

7. The method of claim 1, in which the material forming a volatile compound is a halogen.

8. The method of claim 1, in which one of the metals is nickel.

9. The method of claim 8, in which the other metal is one which forms a volatile halide, and in which a halogen is reacted with the metal.

10. The method of claim 9, in which the halogen is chlorine.

* * * * *